United States Patent
Felknor et al.

(10) Patent No.: US 8,474,182 B2
(45) Date of Patent: Jul. 2, 2013

(54) HANGING PLANTER

(75) Inventors: Wilson A. Felknor, Lenoir City, TN
(US); James Robert Ferron, Loudon,
TN (US); Benjamin James Ferron,
legal representative, Pittsburg, PA (US)

(73) Assignee: Felknor Ventures LLC, Knoxville, TN
(US)

( * ) Notice: Subject to any disclaimer, the term of this
patent is extended or adjusted under 35
U.S.C. 154(b) by 0 days.

(21) Appl. No.: 12/799,790

(22) Filed: Apr. 30, 2010

(65) Prior Publication Data

US 2010/0287832 A1 Nov. 18, 2010

Related U.S. Application Data

(60) Provisional application No. 61/215,051, filed on May 1, 2009.

(51) Int. Cl.
*A01G 9/02* (2006.01)
(52) U.S. Cl.
USPC ............... 47/67; 47/66.1; 47/85; 47/41.12
(58) Field of Classification Search
USPC ............... 47/66.1, 67, 72, 85, 40, 41.12, 39, 47/66.6, 86
See application file for complete search history.

(56) References Cited

U.S. PATENT DOCUMENTS

| | | | | | |
|---|---|---|---|---|---|
| 3,131,510 | A | * | 5/1964 | Engstrom | 47/41.01 |
| 3,778,929 | A | * | 12/1973 | Pearson | 47/58.1 R |
| 4,159,094 | A | * | 6/1979 | Stekoll et al. | 248/318 |
| 4,466,217 | A | * | 8/1984 | Shear | 47/1.01 R |
| 5,355,623 | A | * | 10/1994 | Brown | 47/84 |
| 6,298,600 | B1 | * | 10/2001 | Feldman | 47/67 |
| 7,032,347 | B2 | * | 4/2006 | Hartman | 47/67 |
| D526,595 | S | * | 8/2006 | Taddeo et al. | D11/147 |
| 8,381,440 | B1 | * | 2/2013 | Jabs | 47/66.7 |
| 2005/0091917 | A1 | * | 5/2005 | Brennan | 47/41.01 |

* cited by examiner

*Primary Examiner* — Rob Swiatek
*Assistant Examiner* — Lisa Tsang
(74) *Attorney, Agent, or Firm* — Michael E. McKee

(57) ABSTRACT

A planter capable of being hung from an elevated support includes an open-topped container for containing dirt or potting soil placed therein and a plurality of suspension elements, or cords, which are disposed about and are attached to or act upon the container for suspending the container from an elevated support. The suspension elements extend upwardly from the peripheral edge of the container top and are joined together at a common point disposed above the container for suspension of the planter from the elevated support. In addition, a spacer member is arranged and spaced above the top of the container and cooperates with the suspension elements for preventing the suspension cords from converging toward one another for a distance above the container which corresponds with the spaced distance between the container top and the spacer member.

11 Claims, 8 Drawing Sheets

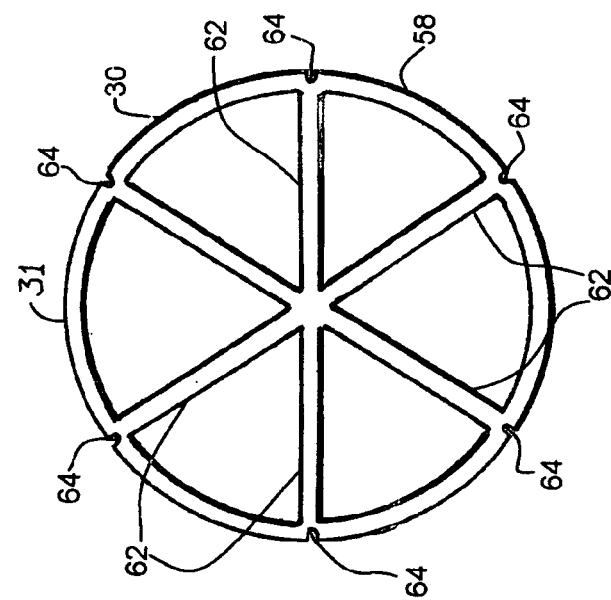
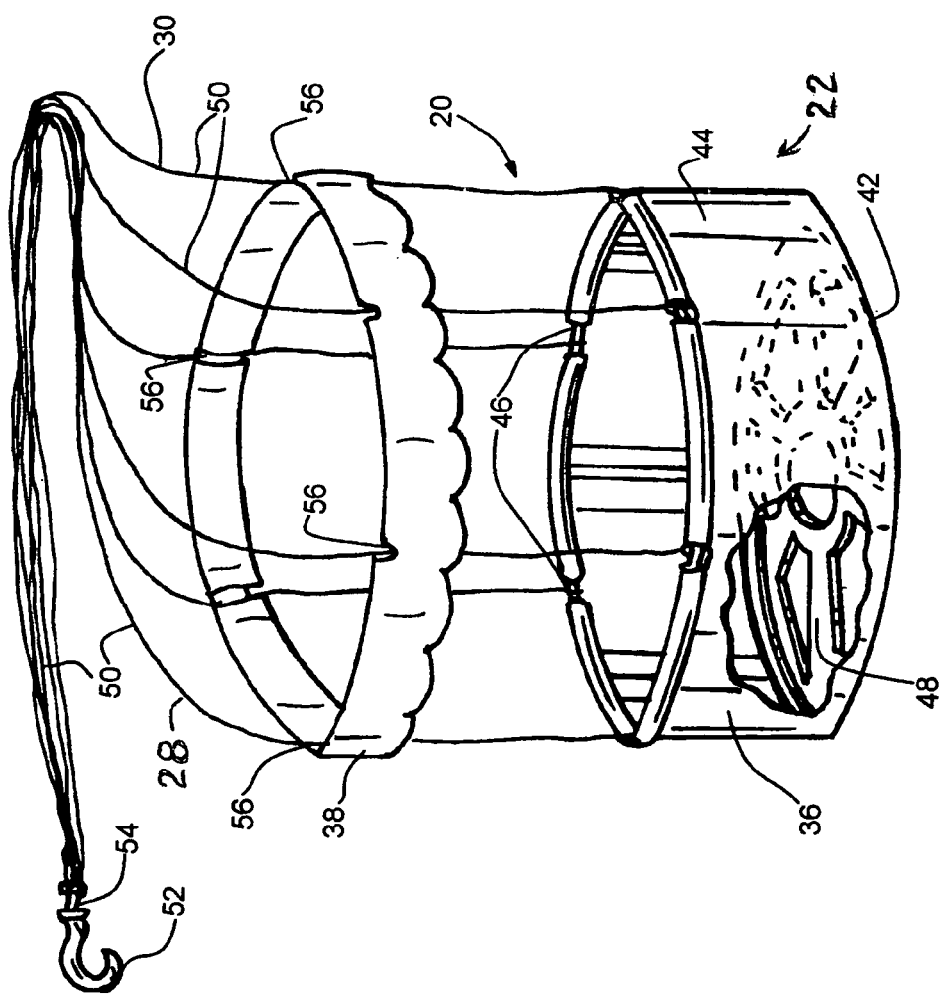

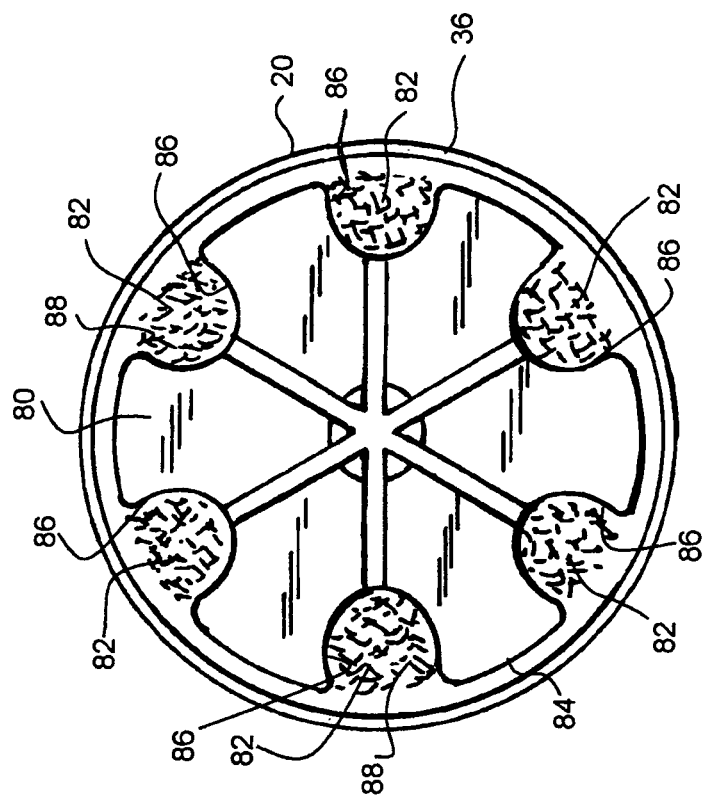
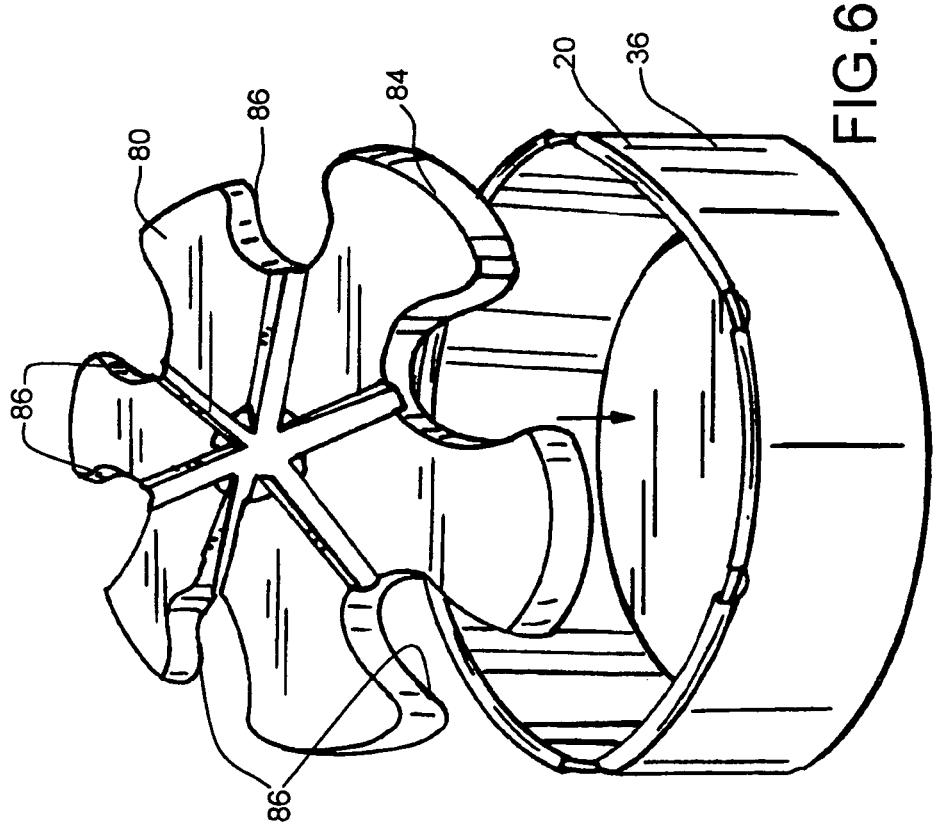
FIG. 7
FIG. 6

HANGING PLANTER

The benefit of Provisional Application Ser. No. 61/215,051, filed May 1, 2009 and entitled HANGING PLANTER is hereby claimed. The disclosure of this referenced provisional patent application is incorporated herein by reference.

BACKGROUND OF THE INVENTION

This invention relates generally to gardening accessories and relates, more particularly, to hanging planters which can be suspended from an elevated support structure.

The class of planters with which this invention is to be compared includes those which include plant-growing containers for holding dirt or potting soil and suspension cords or similar elements with which the planter is suspended from an elevated support structure.

It is not uncommon that within planters of the aforedescribed class, the suspension cords are attached to, or act upon, the circumferential, or outer, edge of the container at regularly-spaced intervals therealong and converge upwardly toward one another to a single location, or hook, situated above the planter for suspension of the planter from the location. This suspension arrangement commonly requires that the suspension cords pass across the region of the container disposed vertically above the container, and the portions of the suspension cords which pass across this region could interfere with the vertically-directed growth of plants being grown within the container.

It would be desirable to provide a new and improved hanging planter of the aforedescribed class whose suspension cords are less likely to interfere with the vertically-directed growth of plants being grown within the container of the planter.

Accordingly, it is an object of the present invention to provide a new and improved hanging planter of the aforedescribed class.

Another object of the present invention is to provide such a planter employing a suspension arrangement which is less likely to interfere with the vertically-directed growth of plants being grown within the container of the planter.

Still another object of the present invention is to provide such a planter whose container is adapted to hold dirt or potting soil positioned therein for growth of plants out the top of the container.

Yet another object of the present invention is to provide such a planter wherein the upper surface of the dirt or potting soil placed within the container has separately-identifiable regions for plant growth.

A further object of the present invention is to provide such a planter which is esthetically pleasing.

A still further object of the present invention is to provide such a planter which is relatively uncomplicated in structure, yet effective in operation.

SUMMARY OF THE INVENTION

This invention resides in a planter capable of being hung from an elevated support.

The planter includes a container for containing dirt or potting soil placed therein, and the container has an upwardly-opening top and a peripheral edge surrounding the top. Furthermore, a plurality of suspension elements are provided for suspending the container from an elevated support. In addition, the suspension elements extend upwardly from the peripheral edge of the container top and are joined together at a common location disposed above the container when used to suspend the planter from the elevated support.

The planter also includes a spacer member which is arranged and spaced above the top of the container and cooperates with the suspension elements for preventing the suspension elements from converging toward one another for a distance above the container which corresponds with the spaced distance between the container top and the spacer member.

BRIEF DESCRIPTION OF THE DRAWINGS

FIG. 2 is a perspective view of the container and suspension system of the FIG. 1 planter wherein the container is shown partly cut-away.

FIG. 3 is a plan view of the spacer member of the FIG. 1 planter.

FIG. 6 is a perspective view of a component of the container of the FIG. 1 planter and a platen insert member which is positionable within the container component for separating the upper surface of the dirt or potting soil positionable within the container component into separately-identifiable growing regions.

FIG. 7 is a plan view of the container component and insert member of FIG. 6 wherein dirt or potting soil has been positioned within the container component and the insert member has been positioned atop the upper surface of the dirt or potting soil.

DETAILED DESCRIPTION OF ILLUSTRATIVE EMBODIMENTS

Figure 1:
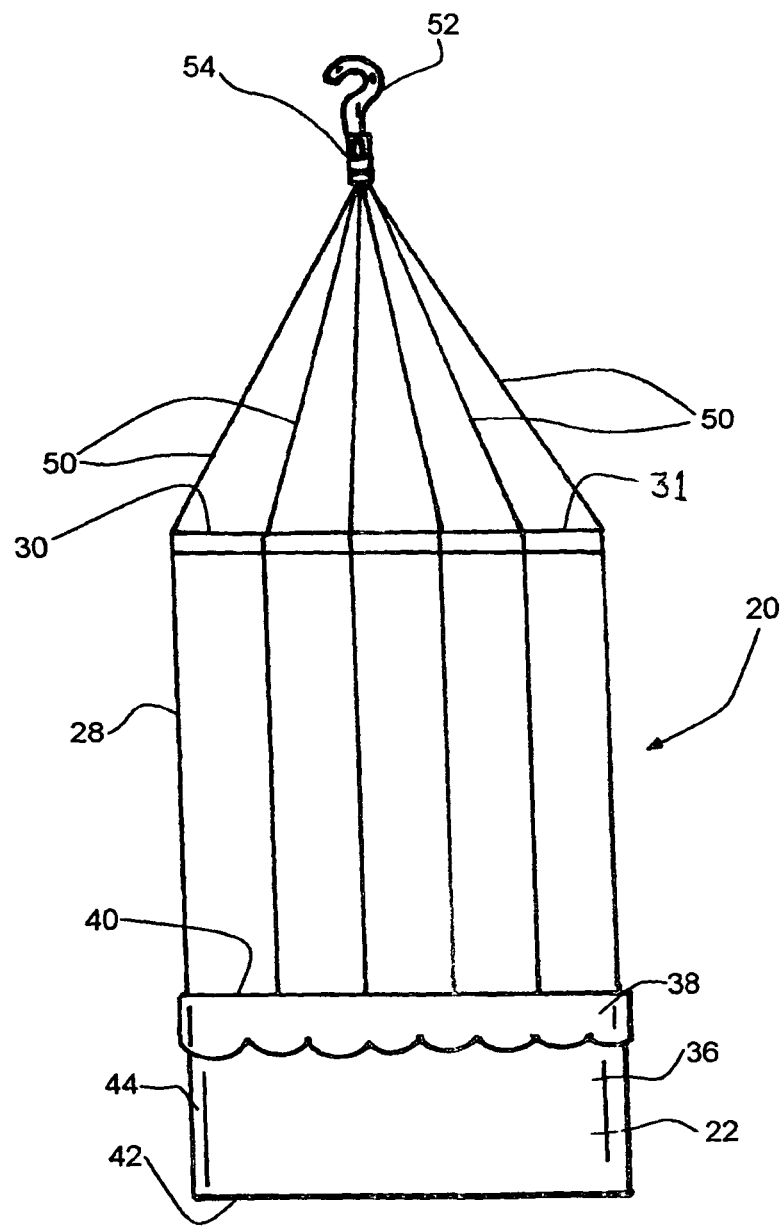
FIG. 1 is a side elevation view of a hanging planter within which features of the present invention are embodied.

Turning now to the drawings in greater detail and considering first FIG. 1, there is illustrated an embodiment, generally indicated 20, of a planter which is capable of being suspended from an elevated support structure (not shown) and within which features of the present invention are embodied. The planter 20 includes a container 22 for containing dirt or potting soil placed within the interior of the container 22 for growth of seeds or plants planted within the container 22. In addition, the planter 20 includes a suspension system 28 for suspending the planter 20 from an elevated support.

The planter 20 also includes a spacer member 30 which is positioned in a spaced relationship above the container 22 and cooperates with the suspension system 28 in a manner which both maintains the spacer member 30 in an elevated condition above the container 22 and which prevents cords 50 (or other suspension elements) associated with the suspension system 28 from converging toward one another for a preselected distance above the container 20. In the depicted planter 20, the spacer member 30 includes a ring-shaped outer portion 31 and a plurality of spokes 62 which extend radially outwardly across the spacer member 30 from the center thereof to the ring-shaped outer portion 31. Because the spacer member prevents the cords 50 from crossing the space situated vertically above the container 22 in this manner, the cords 50 associated with the suspension system 28 are less likely to interfere with any vertically-directed growth of plants growing within the container 22 than would be the case if the cords 50 were permitted to cross the vertical space situated immediately above the container 22.

With reference to FIGS. 1 and 2, the container 22 has a receptacle portion 36 and a decorative portion 38 positioned along the open top, indicated 40, of the container 22. The receptacle portion 36 is substantially cylindrical in shape with a flat bottom 42 and rounded sidewalls 44. Disposed along (e.g. sewn within) the upper edge of the top of the receptacle portion is a steel ring 46 which, as will be apparent herein, strengthens the receptacle portion 36 along the top thereof and provides a rigid member to which the (lower end of the) suspension system 28 is attached. For purposes of stiffening the bottom 42 (and thus enhancing the dirt and soil-holding capabilities of the receptacle portion 36, a platen-like brace 48 having a plurality of radially-extending spokes is positioned within the receptacle portion 36 so as to span the bottom 42 thereof. It will be understood that the brace 48 is positioned within the receptacle portion 36 before dirt or potting soil is placed within the receptacle portion 36.

With reference to FIG. 2, the suspension system 28 includes a plurality of cords 50, introduced earlier, which are looped or otherwise secured at one (i.e. a lower) end about the steel ring 46 which is exposed at a number of (i.e. six) locations along the upper edge of the receptacle portion 36 and are gathered together at the opposite (i.e. upper) ends thereof at an arrangement including a hook 52 and swivel 54. In the depicted planter 20, the cords 50 are strings, but other tensioning elements can be used as cords 50 instead of strings. It is the hook 52 with which the planter 20 is fastened, or hooked, to an elevated structure. Between the lower and upper ends of the cords 50, the cords 50 are each routed through one of a number of (i.e. six) openings 56 provided along the decorative portion 38. When the planter 20 is suspended from an elevated structure, the decorative portion 38 (which possesses a cross section resembling an inverted V) gravitationally rests along the upper edge of the receptacle portion 36.

With reference to FIGS. 1 and 3, the spacer member 30 is relatively flat in shape and resembles a spoked wheel having a circular periphery 60 and a plurality of (i.e. six) radially-extending spokes 62 joined together at the geometric center of the member 30. In addition, the diameter of the circular periphery 60 corresponds to (i.e. is about equal to) the diameter of the container 22 as measured across the top 40 thereof. Defined along the outwardly-directed edge, indicated 58, of the circular periphery 60 are a series of notches 64 (equal in number to the number of cords 50 which extend between the steel ring 46 and the hook 52) which are sized to closely accept a corresponding cord 50 inserted sideways therein.

Figure 4:
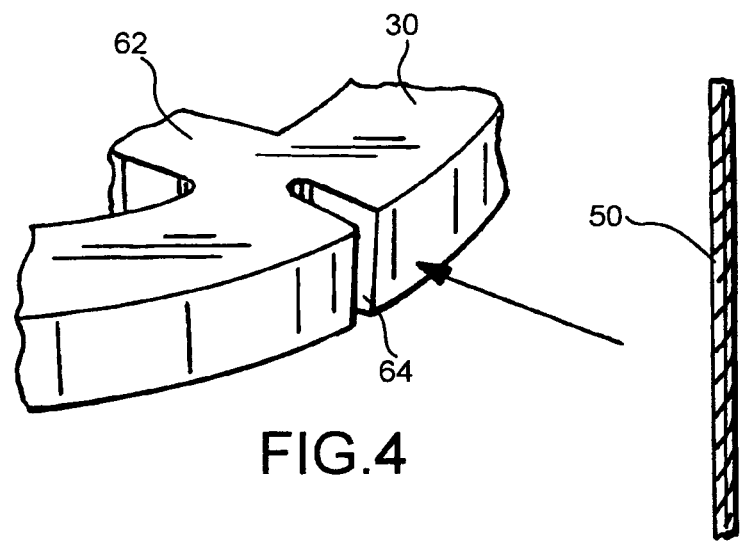
FIGS. 4 and 5 are fragmentary perspective views of the spacer member depicted in FIG. 3 but drawn to a slightly larger scale and depicting the steps involved in interfitting a cord of the planter suspension system within the spacer member.
Figure 5:
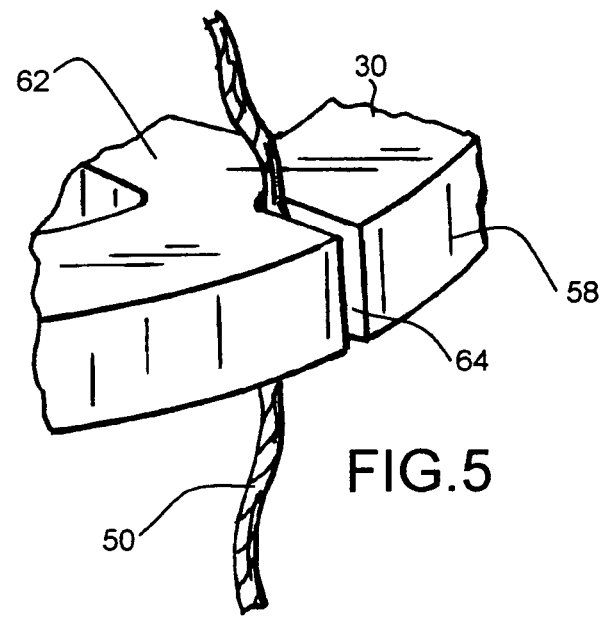

In other words and with reference to FIGS. 4 and 5, the width of each notch 64 is slightly smaller than the diameter of the cord 50 intended to be inserted within the notch 64 so that when each cord 50 is inserted sideways into its corresponding notch 64, the cord 50 is snugly accepted by the notch 64. An advantage provided by this snug-fitting relationship between the cords 50 and the notches 64 is that when the planter 20 is suspended from an elevated structure by the hook 52, the spacer member 30 is maintained in its desired spaced relationship with the top 40 of the container 22 due to the frictional-gripping engagement between the inner surfaces of each notch 64 and the outer surfaces of the cords 50 positioned within the notches 64. Furthermore and by spacing the spacer member 30 at a preselected distance (e.g. about two feet or more) above the top of the container 22, the cords 50 are prevented from converging toward one another for a distance above the container 22 which is about equal to the spaced distance between the top of the container 22 and the spacer member 30 so that the cords 50 are not likely to inhibit any vertically-directed growth of the plants growing within the container 22 for a substantial distance above the container 22.

With reference to FIGS. 6 and 7, the planter 20 also includes a platen insert member 80 which is positionable atop dirt or potting soil placed within the container 22 and which separates the upper surface of the dirt or potting soil placed into the container 22 into separately-identifiable growing regions 82 (FIG. 7). The insert member 80 of the depicted planter 20 is formed (or molded) out of relatively thin plastic and has an outer edge 84 which is provided with a plurality of semi-circular-shaped cutouts 86 formed therein.

With reference to FIG. 7, there is illustrated a view of the container 22 after an amount of dirt 88 is positioned within the container 22 and after which the insert member 80 has been placed in overlying relationship with the upper surface of the dirt 88. As can be seen from the FIG. 7 view, the cutouts 86 leave exposed a corresponding number of areas, or regions 82, within which seeds or plants can be grown. In addition to its purpose for separating the upper surface of the dirt 88 into separately-identifiable growing regions 82, the insert member 80 also shades the intermediate regions of the upper surface of the dirt to reduce the growth of unwanted plants or weeds within the container 22 and helps to maintain moisture within the dirt 88.

Figures 8, 8A:
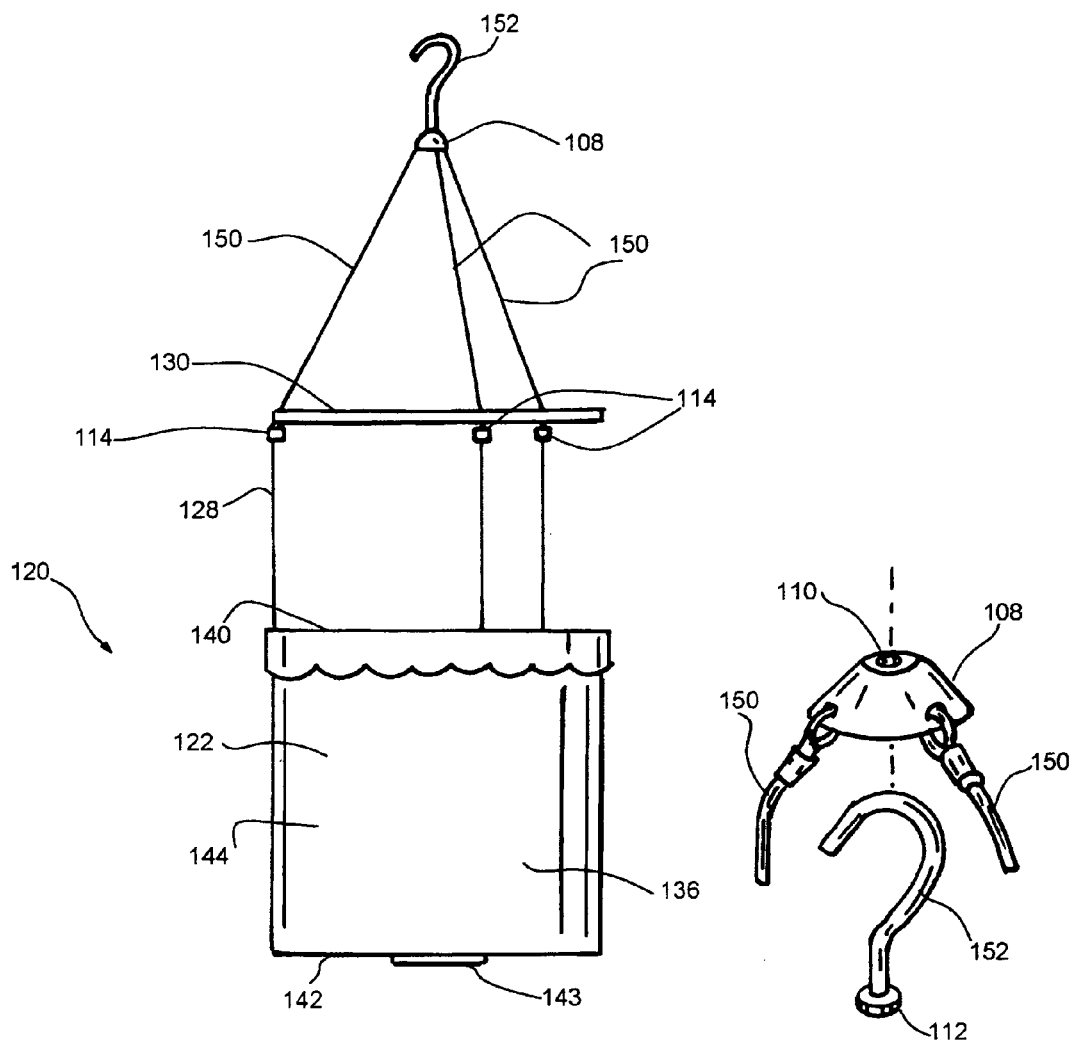
FIG. 8 is a side elevation view of another embodiment of a hanging planter within which features of the present invention are embodied.
FIG. 8A is a perspective view of a fragment of the embodiment of FIG. 8, but drawn to a slightly larger scale and shown exploded.

With reference to FIG. 8, there is illustrated another embodiment of a planter, generally indicated 120, of a planter which is capable of being suspended from an elevated support structure (not shown) and within which features of the present invention are embodied. The planter 120 includes a container 122 for containing dirt or potting soil placed within the interior of the container 122 for growth of seeds or plants planted within the container 122. In addition, the planter 120 includes a suspension system 128 for suspending the planter 120 from an elevated support.

The planter 120 also includes a spacer member 130 which is positioned in a spaced relationship above the container 122 and cooperates with the suspension system 128 in a manner which both maintains the spacer member 130 in an elevated condition above the container 122 and which prevents cable wires 150 (or other suspension elements) associated with the suspension system 128 from converging toward one another for a preselected distance above the container 120. With the cable wires 50 prevented from crossing the space situated vertically above the container 122 in this manner, the cable wires 150 associated with the suspension system 128 are less likely to interfere with any vertically-directed growth of plants growing within the container 122 than would be the case if the cable wires 150 were permitted to cross the vertical space situated immediately above the container 122.

Figure 9:
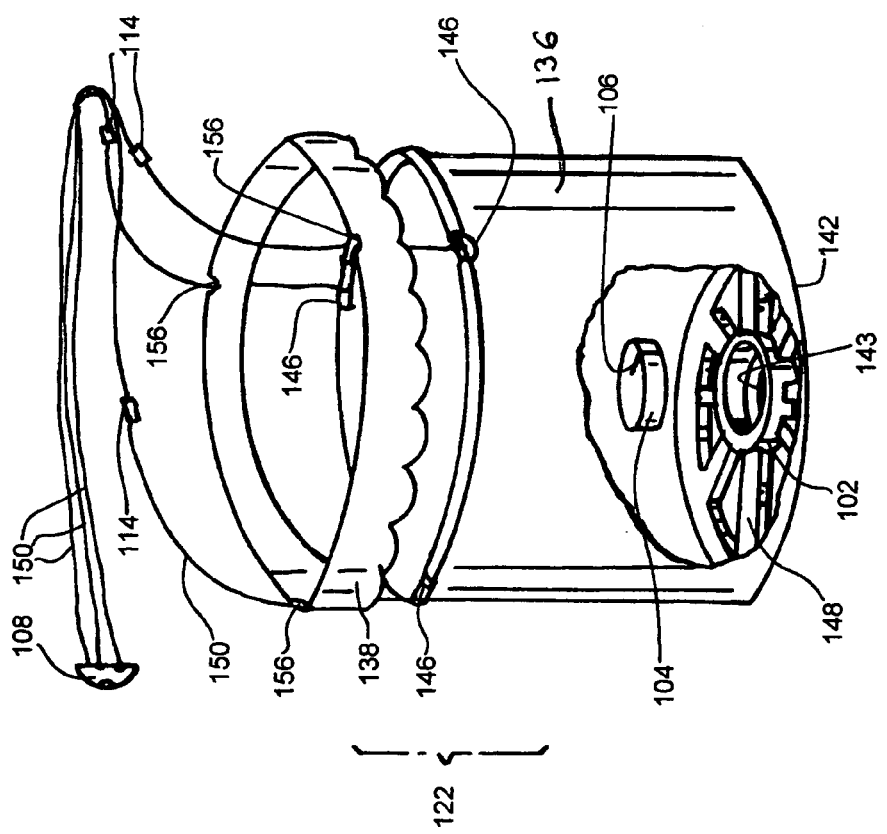
FIG. 9 is a perspective view of the container and suspension system of the FIG. 8 planter wherein the container is shown partly cut-away.

With reference to FIGS. 8 and 9, the container 122 has a receptacle portion 136 and a decorative portion 138 positioned along the open top, indicated 140, of the container 122. The receptacle portion 136 is substantially cylindrical in shape with a flat bottom 142 (having a central opening 143 therein) and rounded sidewalls 144. Disposed along (e.g. sewn within) the upper edge of the top of the receptacle portion is a steel ring 146 which, as will be apparent herein, strengthens the receptacle portion 136 along the top thereof and provides a rigid member to which the (lower end of the) suspension system 128 is attached. For purposes of stiffening the bottom 142 (and thus enhancing the dirt and soil-holding capabilities of the receptacle portion 136, a platen-like brace 148 having a plurality of radially-extending spokes is positioned within the receptacle portion 136 so as to span the bottom 142 thereof. It will be understood that the brace 148 is positioned within the receptacle portion 136 before dirt or potting soil is placed within the receptacle portion 136.

Included within the brace 136 and as best shown in FIG. 9 is a centrally-disposed ring-like portion 102 which is centrally located therein, and there is associated with the brace 148 a circular foam body 104 having a slit 106 which extends from one side thereof. When the brace 148 is positioned atop the bottom 142 of the receptacle portion 136, the opening in the ring-like portion 102 is aligned with the centrally-disposed opening 143 provided in the receptacle bottom 142. The foam body 104 is sized to be accepted by the ring-like portion 102 when inserted downwardly therein for supporting, if desired, a plant (not shown) for growth out of the bottom 142 of the receptacle portion 136.

The manner in which a plant can be supported for growth out of the bottom 142 of the receptacle portion 136 is explained in U.S. Pat. No. 6,874,278, having the same assignee as the instant application, so that a detailed description of the cooperation between the foam body 104 and the ring-like portion 102 of the brace 148 is not believed to be necessary. Suffice it to say by inserting the root system of a plant upwardly into receptacle portion 136 through the aligned openings provided in the bottom 142 and ring-like portion 102, and directing the slit 106 of the foam body 104 about the stem of the plant, the foam body 104 can thereafter be directed downwardly into the ring-like portion 102 to secure the root system of the plant within the interior of the receptacle portion 136. For a more detailed description of the manner in which the ring-like portion 102 and foam body 104 cooperate to hold a plant within the receptacle portion 136 for growth out the bottom 142 thereof, reference can be had to the aforementioned U.S. Pat. No. 6,874,278, the disclosure of which is incorporated herein by reference.

With reference to FIGS. 8, 8A and 9, the suspension system 128 includes a plurality of (i.e. three) cable wires 150, introduced earlier, which are looped and fastened at one (i.e. a lower) end about the steel ring 146 which is exposed at a number of (i.e. three) locations along the upper edge of the receptacle portion 136 and are fastened together at the opposite (i.e. upper) ends thereof to a downwardly-opening disc 108. As best shown in FIG. 8A, the disc 108 includes a center hole 110 through which a hook 152 can be manipulated for suspending the planter 120 from an elevated support. The hook 152 includes a lower end 112 of enlarged diameter so that upon manipulating the hook 152 upwardly through the center hole 110 of the disc 108, the lower end 112 is prevented from passing through the hole 110 so that when supported by the hook 152, the weight of the receptacle means 136 is transferred to the lower end 112 of the hook 152 through the disc 108.

Between the lower and upper ends of the cable wires 150, the cable wires 150 are each routed through one of a number of (i.e. three) openings 156 provided along an (upper) edge of the decorative portion 138, and a boss element 114 (FIG. 8) is clamped about the length of each cable wire 150 at a spaced distance from the lower end of the cable wire 150. As will be apparent herein, the boss elements 114 provide stops upon which the spacer member 130 is permitted to rest when accepting the cable wires 150 in a manner described herein.

Figure 10:
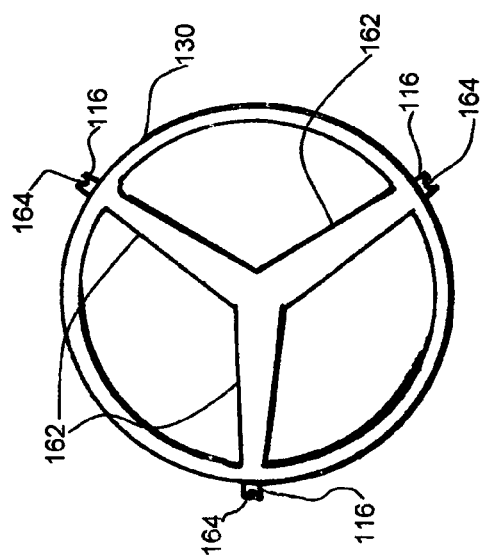
FIG. 10 is a plan view of the spacer member of the FIG. 8 planter.

With reference to FIGS. 8 and 10, the spacer member 130 of the depicted planter 120 is molded (from plastic) into somewhat of a flat shape resembling a spoked wheel having a circular periphery 160 and a plurality of (i.e. three) radially-extending spokes 162 joined together at the geometric center of the member 130. In addition, the diameter of the circular periphery 160 corresponds to (i.e. is about equal to) the diameter of the container 122 as measured across the top 140 thereof. Integrally associated with the spacer member 130 so as to extend outwardly of the periphery thereof are three protuberances 116 which are regularly spaced thereabout, and each protuberance 116 defines a vertically-disposed and outwardly-directed notch 164 along its outwardly-directed edge, indicated 158, of the protuberance 116. Each notch 164 is sized to closely accept a corresponding cable wire 150 inserted sideways therein.

Figure 11:
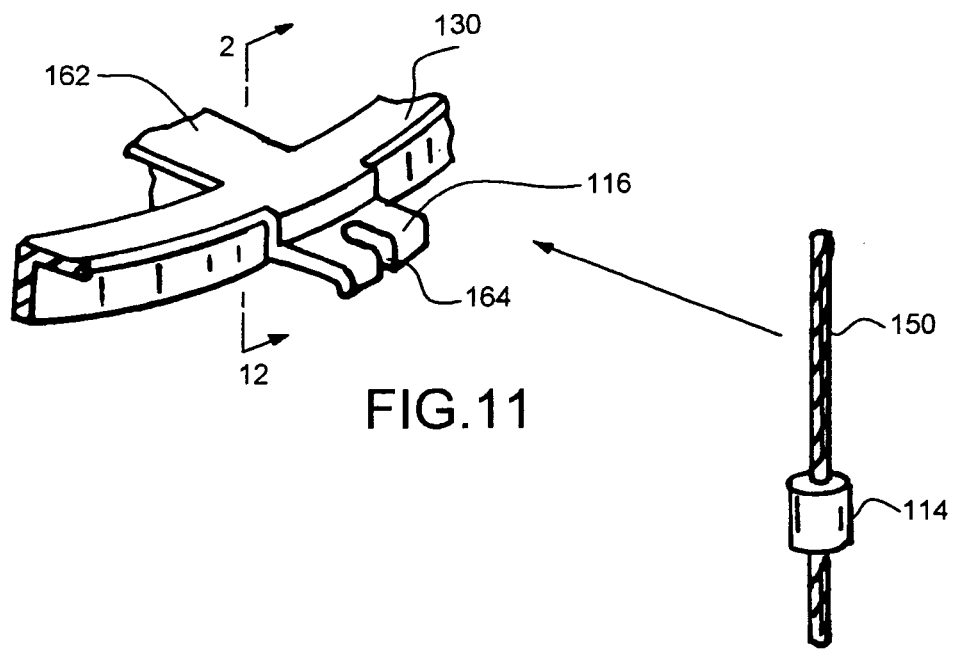
FIG. 11 is a fragmentary perspective view of the spacer member depicted in FIG. 10 and a fragment of the cable of the suspension system of the FIG. 8 planter, shown before assembly.
Figure 12:
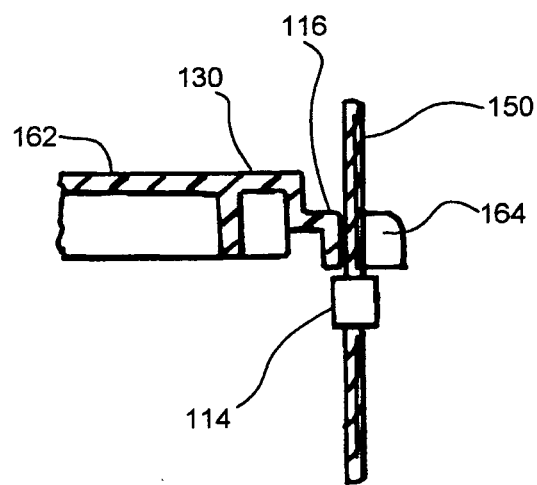
FIG. 12 is a cross-sectional view taken about line 12-12 of FIG. 11 following the assembly of the spacer member and cable of FIG. 11.

In other words and with reference to FIGS. 11 and 12, the width of each notch 164 is slightly smaller than the diameter of the cable wire 150 intended to be inserted within the notch 164 so that when each cable wire 150 is inserted sideways into its corresponding notch 164, the cable wire 150 is snugly accepted by the notch 164. An advantage provided by this close-, or snug-, fitting relationship between the cable wires 150 and the notches 164 is that when the planter 120 is suspended from an elevated structure by the hook 152, the spacer member 130 is maintained in its desired spaced relationship with the top 140 of the container 122 due to the frictional-gripping engagement between the inner surfaces of each notch 164 and the outer surfaces of the cable wires 150 positioned within the notches 64.

It also follows that by inserting the cable wires 150 into the notches 164 immediately above the boss elements 114 clamped about the cable wires 150, the spacer member 130 is permitted to rest upon the boss elements 114. In other words, the boss elements 114 act as stop members upon which the spacer member 130 is permitted to rest when the planter 120 is suspended with the hook 152 so that the spacer member 130 is prevented from sliding downwardly along the cable wires 150 below the level of the boss elements 114.

Figure 14:
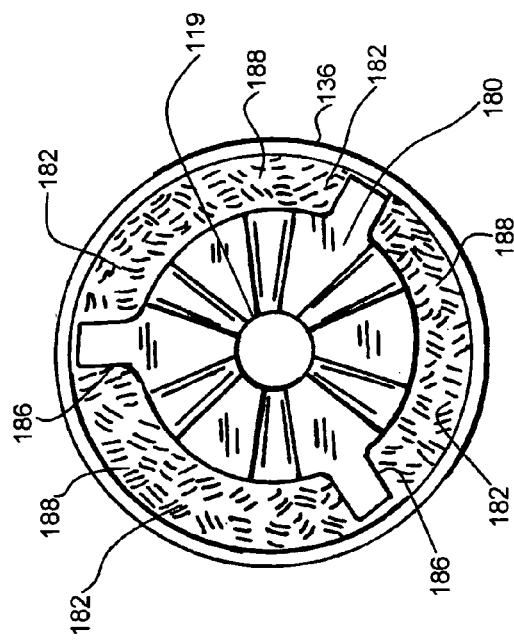
FIG. 14 is a plan view of the container component and insert member of FIG. 13 wherein dirt or potting soil has been positioned within the container component and the insert member has been positioned atop the upper surface of the dirt or potting soil.
Figure 13:
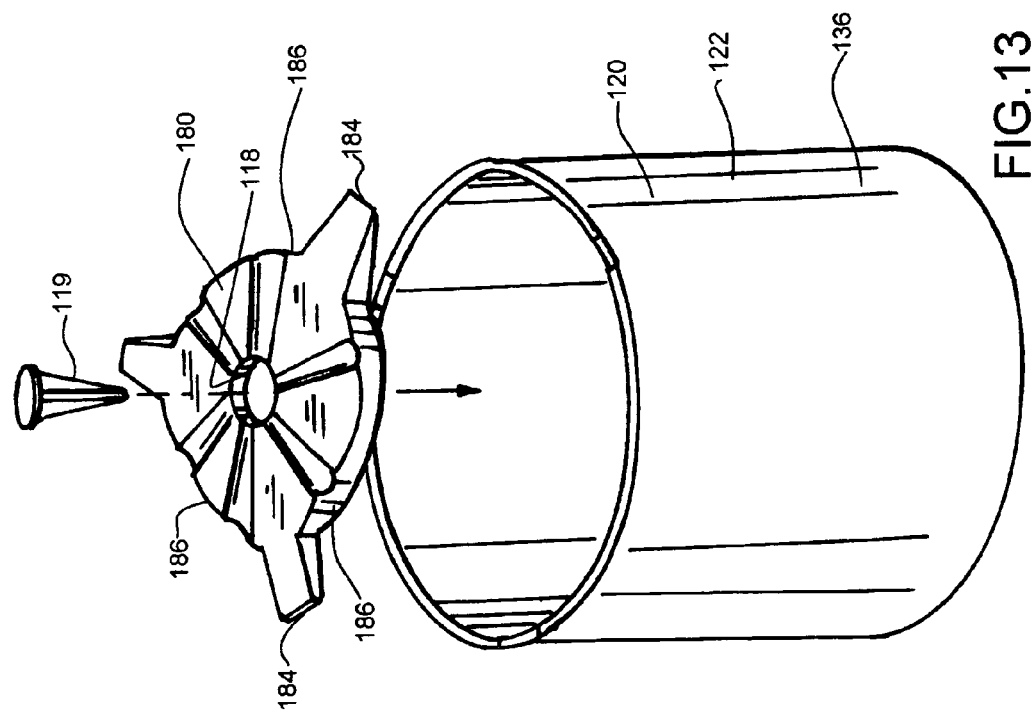
FIG. 13 is a perspective view of a component of the container of the FIG. 8 planter and a platen insert member which is positionable within the container component for separating the upper surface of the dirt or potting soil positionable within the container component into separately-identifiable growing regions.

With reference to FIGS. 13 and 14, the planter 120 also includes a platen insert member 180 which is positionable atop dirt or potting soil placed within the container 122 and which separates the upper surface of the dirt or potting soil placed into the container 122 into separately-identifiable growing regions 182 (FIG. 14). The insert member 180 of the depicted planter 120 is formed (or molded) out of relatively thin plastic and has an outer edge 184 which is provided with a plurality of (i.e. three) arcuate-shaped cutouts 186 formed therein. If desired, the insert member 180 can be provided with a centrally-disposed opening 118 for accepting a retaining peg 119 inserted downwardly therethrough. Both the insert member 180 and retaining peg 119 can be molded out of plastic, but these items can be constructed out of other materials.

With reference to FIG. 14, there is illustrated a view of the container 122 after an amount of dirt 188 is positioned within the container 122 and after which the insert member 180 has been placed in overlying relationship with the upper surface of the dirt 188 and secured therein with the retaining peg 119. As can be seen from the FIG. 14 view, the cutouts 186 leave exposed a corresponding number (i.e. three) of areas, or regions 182, within which seeds or plants can be grown. In addition to its purpose for separating the upper surface of the dirt 188 into separately-identifiable growing regions 182, the insert member 180 also shades the intermediate regions of the upper surface of the dirt to reduce the growth of unwanted plants or weeds within the container 122 and helps to maintain moisture within the dirt 188.

Exemplary dimensions of the planter 120 are provided here as follows: The diameter of the container 112 is about 10.75 inches in diameter and about 11.5 inches in depth; the centrally-disposed opening 143 provided in the receptacle bottom 142 is about 3.0 inches in diameter; the distance between the base of each notch 164 and the center of the spacer member 130 (corresponding generally with the radius of the spacer member 130) is about 5.375 inches; each cable wire 150 is about 20.0 inches in length; and the spaced distance between the top of each boss element, or stop member, 114 and the top of the container 112 to which the corresponding cable wire 150 is connected (corresponding with the desired minimum spaced distance between the top of the container 112 and the spacer member 130) is about seven inches. Furthermore and if desired, the strength of the sidewalls of the container 112 can be reinforced with straps (not shown) which extend vertically along the inside walls of the container 112 between the top thereof and the bottom thereof.

It will be understood that numerous modifications and substitutions can be had to the aforedescribed embodiments 20 and 120 without departing from the spirit of the invention. Accordingly, the aforedescribed embodiment 20 is intended for the purpose of illustration and not as limitation.

The invention claimed is:

1. A planter capable of being hung from an elevated support, the planter comprising:
   a container for containing dirt or potting soil placed therein, the container having an upwardly-opening top and a peripheral edge surrounding the top and wherein the dirt or potting soil which is placed within the container has an upper surface;
   a plurality of suspension elements arranged about the container top for suspending the container from an elevated support and wherein the suspension elements extend upwardly from the peripheral edge of the container top and are joined together at a common location disposed above the container when used to suspend the planter from the elevated support; and
   a spacer member which is arranged and spaced above the top of the container and cooperates with the suspension elements for preventing the suspension elements from converging toward one another for a distance above the container which corresponds with the spaced distance between the container top and the spacer member;
   wherein the container is substantially cylindrical in shape having a circular top, the spacer member defines a plurality of notches which are arranged substantially in a circle, and each notch opens radially outwardly of the spacer member and closely accepts a corresponding suspension element when the spacer member cooperates with the suspension elements as aforesaid;
   the spacer member includes a ring-shaped outer portion having a peripheral edge, and the notches are defined along the peripheral edge of the spacer member; and
   the spacer member further includes a plurality of spokes which extend radially outwardly of the spacer member from about the center thereof to the ring-shaped outer portion wherein the spokes are permanently fixed in position relative to one another and are sized so as not to extend radially outwardly of the ring-shaped outer portion; and
   a platen member which in use is positioned upon the upper surface of the dirt or potting soil placed within the container, the planten member for separating the upper surface of the dirt or potting soil into separately-identifiable growing regions, the platen member including solid areas for covering portions of the upper surface of the dirt or potting soil placed within the container, having an outer edge, and being provided with outwardly-opening cutouts along its outer edge for bordering separately-identifiable growing regions of the upper surface of the dirt or potting soil placed within the container and for providing access to the separately-identified growing regions bordered thereby, and wherein the platen member has a central opening defined in the center thereof and the planter further includes
   a retaining peg for pinning the platen member upon the upper surface of the dirt or potting soil placed within the container, the retaining peg having a head end and an opposite pointed shank depending downwardly from the head end and tapering inwardly therefrom, and wherein the head end of the retaining peg is closely adjacent the platen member when the retaining peg is inserted into the central opening defined in the center of the platen member.

2. The planter as defined in claim 1 wherein the suspension elements are regularly spaced around the container top, and the notches which are defined in the spacer member are regularly spaced around the circle about which the notches are arranged.

3. The planter as defined in claim 1 wherein the spacer member has a radially outwardly-directed peripheral edge whose size generally corresponds to that of the container top.

4. The planter as defined in claim 1 wherein the spacer member has a radially outwardly-directed peripheral edge within which the plurality of outwardly-opening notches are defined, and each notch has interior surfaces which are sized to closely accept a corresponding portion of a suspension element positioned therein in frictional-gripping engagement therewith so that when the planter is suspended from an elevated support, the spacer member is maintained in a spaced relationship above the container top by the frictional-gripping engagement between the interior surfaces of the notches defined in the spacer member and the suspension elements.

5. The planter as defined in claim 4 wherein each suspension element further includes a stop member fixedly secured thereto and situated along the suspension element so that when the spacer member cooperates with the suspension elements as aforesaid and each suspension member is closely accepted by a corresponding notch, each stop member is disposed immediately beneath a corresponding notch for limiting any downward movement of the spacer member along the suspension elements.

6. The planter as defined in claim 5 wherein each stop member is adapted to maintain a spacing between the spacer member and the top of the container of at least about seven inches.

7. The planter as defined in claim 1 wherein the container top is substantially rounded in shape, and the outer edge is sized to conform to the rounded shape of the container top, and the cutouts provided along the outer edge of the platen member are regularly spaced therearound.

8. The planter as defined in claim 1 wherein the container is substantially cylindrical in shape having a circular top, and the container is about 10.75 inches in diameter and about 11.5 inches in depth.

9. A planter capable of being hung from an elevated support, the planter comprising:
- a container for containing dirt or potting soil placed therein, the container having an upwardly-opening top and a peripheral edge surrounding the top and wherein the dirt or potting soil which is placed within the container has an upper surface;
- a plurality of suspension elements which are arranged about the top of the container for suspending the container from an elevated support and wherein the suspension elements extend upwardly from the peripheral edge of the container top and are joined together at a common location disposed above the container when used to suspend the planter from the elevated support;
- a spacer member which is arranged and spaced above the top of the container and cooperates with the suspension elements for preventing the suspension elements from converging toward one another for at least a distance of about seven inches above the container;
- wherein the container is substantially cylindrical in shape having a circular top, the spacer member defines a plurality of notches which are arranged substantially in a circle, and each notch opens radially outwardly of the spacer member and closely accepts a corresponding suspension element when the spacer member cooperates with the suspension elements as aforesaid;
- the spacer member includes a ring-shaped outer portion having a peripheral edge, the notches are defined along the peripheral edge of the spacer member; and
- the spacer member further includes a plurality of spokes which extend radially outwardly of the spacer member from about the center thereof to the ring-shaped outer portion wherein the spokes are permanently fixed in position relative to one another and are sized so as not to extend radially outwardly of the ring-shaped outer portion; and
- a platen member which in use is positioned upon the upper surface of the dirt or potting soil placed within the container, the planten member for separating the upper surface of the dirt or potting soil into separately-identifiable growing regions, the platen member including solid areas for covering portions of the upper surface of the dirt or potting soil placed within the container, having an outer edge, and being provided with outwardly-opening cutouts along its outer edge for bordering separately-identifiable growing regions of the upper surface of the dirt or potting soil placed within the container and for providing access to the separately-identified growing regions bordered thereby, and wherein the platen member has a central opening defined in the center thereof and the planter further includes
- a retaining peg for pinning the platen member upon the upper surface of the dirt or potting soil placed within the container, the retaining peg having a head end and tapering inwardly therefrom, and wherein the head end of the retaining peg is closely adjacent the platen member when the retaining peg is inserted into the central opening defined in the center of the platen member.

10. The planter as defined in claim 9 wherein the spacer member has a radially outwardly-directed peripheral edge within which the plurality of outwardly-opening notches are defined, and each notch has interior surfaces which are sized to closely accept a corresponding portion of a suspension element positioned therein in frictional-gripping engagement therewith so that when the planter is suspended from an elevated support, the spacer member is maintained in a spaced relationship above the container top by the frictional-gripping engagement between the interior surfaces of the notches defined in the spacer member and the suspension elements.

11. The planter as defined in claim 10 wherein each suspension element further includes a stop member fixedly secured thereto and situated along the suspension element so that when the spacer member cooperates with the suspension elements as aforesaid and each suspension member is closely accepted by a corresponding notch, each stop member is disposed immediately beneath a corresponding notch for limiting any downward movement of the spacer member along the suspension elements.

\* \* \* \* \*